US011251900B2

United States Patent
Gorday et al.

(10) Patent No.: US 11,251,900 B2
(45) Date of Patent: Feb. 15, 2022

(54) SYSTEM, APPARATUS AND METHOD FOR AUTOMATICALLY DETERMINING CONFIGURATION PARAMETERS FOR WIRELESS DEVICES

(71) Applicant: Silicon Laboratories Inc., Austin, TX (US)

(72) Inventors: Robert Mark Gorday, Austin, TX (US); Guner Arslan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 52 days.

(21) Appl. No.: 16/722,545

(22) Filed: Dec. 20, 2019

(65) Prior Publication Data

US 2021/0194618 A1 Jun. 24, 2021

(51) Int. Cl.
*H04L 1/00* (2006.01)
*H04L 1/18* (2006.01)
*H04L 27/26* (2006.01)
*H04L 27/00* (2006.01)
*H04L 5/00* (2006.01)

(52) U.S. Cl.
CPC .......... *H04L 1/0003* (2013.01); *H04L 1/1812* (2013.01); *H04L 5/0007* (2013.01); *H04L 27/0008* (2013.01); *H04L 27/2666* (2013.01)

(58) Field of Classification Search
CPC ... H04L 1/0003; H04L 1/1812; H04L 5/0007; H04L 27/0008; H04L 27/2666
See application file for complete search history.

(56) References Cited

U.S. PATENT DOCUMENTS

| | | | | |
|---|---|---|---|---|
| 5,809,327 | A * | 9/1998 | Wollan | G06F 15/7814 712/33 |
| 5,915,214 | A * | 6/1999 | Reece | H04M 15/84 455/406 |
| 7,298,784 | B2 * | 11/2007 | Matsusaka | H04L 1/0003 375/224 |
| 9,984,190 | B1 * | 5/2018 | Aurich | G06F 30/367 |

(Continued)

OTHER PUBLICATIONS

U.S. Patent and Trademark Office, Office Action dated Jun. 11, 2020 in U.S. Appl. No. 16/722,512, and Response to Office Action filed Aug. 25, 2020, 19 pages total.

(Continued)

*Primary Examiner* — Freshteh N Aghdam

(74) *Attorney, Agent, or Firm* — Trop, Pruner & Hu, P.C.

(57) ABSTRACT

A wireless device may include: a radio frequency (RF) front end circuit to receive and process an RF signal; a mixer to downconvert the RF signal to a second frequency signal; a digitizer to digitize the second frequency signal; a channel filter to channel filter the digitized signal; a selection circuit having a first input coupled to the channel filter and a plurality of outputs each to couple to one of a plurality of demodulators; and the plurality of demodulators coupled to the selection circuit. The selection circuit may route the channel filtered digitized signal to a first demodulator of the plurality of demodulators based on a first configuration setting. The wireless device may also include a non-volatile storage with a configuration file including the first configuration setting. The configuration file may be automatically generated by a hardware configurator in response to a plurality of user input parameters.

15 Claims, 7 Drawing Sheets

(56) References Cited

U.S. PATENT DOCUMENTS

| | | |
|---|---|---|
| 10,623,225 B2 | 4/2020 | Cao et al. |
| 10,637,705 B1 | 4/2020 | Shattil |
| 2002/0044221 A1 | 4/2002 | Okada |
| 2014/0177855 A1 | 6/2014 | Polinske et al. |

OTHER PUBLICATIONS

U.S. Patent and Trademark Office, Office Action dated Jun. 23, 2020 in U.S. Appl. No. 16/722,568, 13 pages total.
Silicon Labs, "AN0823: Configuring Peripherals for 8-Bit Devices in Simplicity Studio," Initial Revision: Feb. 2014, Last Revision: Sep. 21, 2017, 12 pages total.
Silicon Labs, "AN0822: Simplicity Studio™ User's Guide," Initial Revision: Feb. 2014, Last Revision: Jun. 2018, 40 pages total.
U.S. Appl. No. 16/722,512, filed Dec. 20, 2019, entitled "Base Spreading Code Determination for a Wireless Communication Protocol," by Guner Arslan.
U.S. Appl. No. 16/722,568, filed Dec. 20, 2019, entitled "System, Apparatus and Method for Calculating Nominal Symbol Levels for Wireless Communication Sequences," by Guner Arslan.

\* cited by examiner

SYSTEM, APPARATUS AND METHOD FOR AUTOMATICALLY DETERMINING CONFIGURATION PARAMETERS FOR WIRELESS DEVICES

BACKGROUND

Many different types of wireless communication protocols exist, and can be used in many different contexts. Wireless transmitters and receivers are often formed with one or more integrated circuits (ICs) that can handle multiple communication protocols such as short-range protocols, long-range protocols, etc. And with the growth of internet of things (IoT) devices, wireless capabilities are being adopted into an ever increasing amount of devices. However many of these devices are designed and built by people who have no understanding of wireless communication theory, operation, etc. And thus there is a need for skilled engineers/technicians to configure ICs for use in particular devices and communication use cases. But this comes at a significant expense, which can be prohibitive for both an IC designer/manufacturer and for end devices' designers/manufacturers, especially for low volume devices.

SUMMARY OF THE INVENTION

In one aspect, a method includes: receiving, in a configurator for a wireless device, a plurality of user-defined parameters for configuring the wireless device for wireless communication; iteratively, for each of a plurality of subroutines of the configurator, determining whether all required inputs for the subroutine are available, in response to determining that all the required inputs are available executing the subroutine to determine one or more configuration settings associated with the subroutine and for the wireless device, and storing the one or more configuration settings in a configuration buffer, where a first subroutine of the plurality of subroutines is to select a first demodulator of a plurality of demodulators of the wireless device to operate using the required inputs comprising a modulation type and a modulation index to identify a class associated with a priority list of at least some of the plurality of demodulators, the class including the first demodulator; after the plurality of subroutines are executed, generating a configuration file including the one or more configuration settings associated with each of the plurality of subroutines; and configuring the wireless device with the configuration file to cause the wireless device to operate using the one or more configuration settings associated with at least some of the plurality of subroutines.

In an embodiment, the method further comprises in response to determining that all the required inputs for a given subroutine are not available, proceeding to another subroutine of the plurality of subroutines to determine whether all the required inputs are available for the another subroutine. The method also may include in response to executing a given subroutine to determine the one or more configuration settings associated with the given subroutine, setting a completion flag for the given subroutine to indicate that the given subroutine successfully completed execution. The method may include in response to determining that the plurality of subroutines have successfully executed, re-executing the plurality of subroutines to re-determine the one or more configuration settings associated with each of the plurality of subroutines. After re-executing the plurality of subroutines, it may be determined whether any of the one or more configuration settings have changed. In response to determining that any of the one or more configuration settings have changed, the plurality of subroutines may be re-executed. In response to determining that none of the one or more configuration settings changed after re-executing the plurality of subroutines, the configuration file may be formed.

In an embodiment, the method further includes executing a second subroutine to determine a plurality of bandwidths for the wireless device based at least in part on the modulation type, a frequency offset and the selection of the first demodulator, the plurality of bandwidths comprising a first bandwidth for an acquisition mode and a second bandwidth for a demodulation mode. At least one of the required inputs for a given subroutine of the plurality of subroutines may be a first configuration setting determined by a second subroutine of the plurality of subroutines. Configuring the wireless device may include communicating the configuration file from the configurator to a non-volatile storage of the wireless device for storage in the non-volatile storage.

In another aspect, a wireless device may include: a radio frequency (RF) front end circuit to receive and process an RF signal received from an antenna; a mixer to downconvert the RF signal to a second frequency signal; a digitizer coupled to the mixer to digitize the second frequency signal; a channel filter coupled to the digitizer to channel filter the digitized signal; a selection circuit having a first input coupled to the channel filter, the selection circuit further having a plurality of outputs each to couple to one of a plurality of demodulators; the plurality of demodulators coupled to the selection circuit, where the selection circuit is to route the channel filtered digitized signal to a first demodulator of the plurality of demodulators based on a first configuration setting; and a non-volatile storage including at least one configuration file having the first configuration setting, where the at least one configuration file is automatically generated by a hardware configurator in response to a plurality of user input parameters.

In an embodiment, the hardware configurator is to automatically select the first demodulator based at least in part on the plurality of user input parameters comprising a modulation type and a modulation index. The wireless device further may include a plurality of decimators, and where the hardware configurator is to determine a decimation factor for each of the plurality of decimators based at least in part on the selected first demodulator and one or more of the plurality of user input parameters. The hardware configurator may identify a first class of a plurality of classes based at least in part on one or more of the plurality of user input parameters. The hardware configurator may select the first demodulator according to a priority determination for the first class.

In another aspect, a method includes: receiving, in a configurator, a plurality of user-defined parameters for configuring a wireless device for wireless communication; iteratively, for each of a plurality of subroutines of the configurator, determining whether all required inputs for the subroutine are available, in response to determining that all the required inputs are available executing the subroutine to determine one or more configuration settings associated with the subroutine and for the wireless device, and storing the one or more configuration settings in a configuration buffer, where a first subroutine of the plurality of subroutines is to select a first demodulator of a plurality of demodulators of the wireless device to operate using the required inputs comprising a modulation type and a modulation index to identify a class associated with a priority list of at least some of the plurality of demodulators, the class including the first demodulator; after the plurality of subroutines are executed, generating a configuration file including the one or more configuration settings associated with each of the plurality of subroutines; and configuring the wireless device with the configuration file to cause the wireless device to operate using the one or more configuration settings associated with at least some of the plurality of subroutines.

In an embodiment, the method further includes in response to determining that all the required inputs for a given subroutine are not available, proceeding to another subroutine of the plurality of subroutines to determine whether all the required inputs are available for the another subroutine. The method may further include: in response to determining that the plurality of subroutines have successfully executed, re-executing the plurality of subroutines to re-determine the one or more configuration settings associated with each of the plurality of subroutines; and after re-executing the plurality of subroutines, determining whether any of the one or more configuration settings have changed. In response to determining that any of the one or more configuration settings have changed, the plurality of subroutines may again be re-executed. The method may further include executing a second subroutine to determine a plurality of bandwidths for the wireless device based at least in part on the modulation type, a frequency offset and the selection of the first demodulator, the plurality of bandwidths comprising a first bandwidth for an acquisition mode and a second bandwidth for a demodulation mode.

DETAILED DESCRIPTION

In various embodiments, techniques are provided to enable an unsophisticated user to obtain optimal settings for a wireless device that the user is seeking to employ. More particularly in embodiments the user may provide a limited set of desired operating parameters for a wireless system. From these limited parameters, a configurator device may automatically determine a large amount of configuration settings that can be programmed into wireless devices, including both transmitters and receivers.

Figure 1:
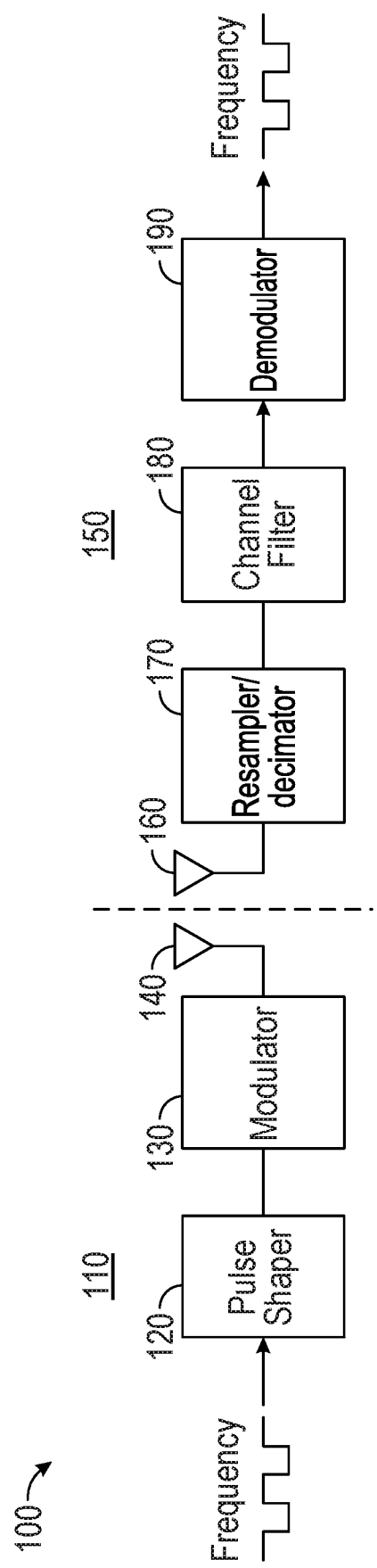
FIG. 1 is a high level view of a wireless communication environment in accordance with an embodiment.

Referring now to FIG. 1, shown is a high level view of a wireless communication environment in accordance with an embodiment. As shown in FIG. 1, wireless environment 100 may be any location in which a wireless transmitter 110 and a wireless receiver 150 are present. In some cases, environment 100 may be within a local area such as a wireless local area network in which wireless transmitter 110 and wireless receiver 150 are closely located to each other, e.g., within approximately 0.0 meters (m) to 50 m. In other cases, environment 100 may be a wireless wide area arrangement in which wireless transmitter 110 and wireless receiver 150 are separated by potentially much greater distances.

In any case, environment 100 is shown with wireless transmitter 110 and wireless receiver 150 to illustrate possible environments in which these devices may communicate. With embodiments herein, one or more of wireless transmitter 110 and wireless receiver 150 may be configured, based at least in part on high level user-provided configuration parameters. Using this information, a configurator device (not shown for ease of illustration in FIG. 1) may automatically determine configuration settings for a great number of components of the devices.

After receipt in the configurator of these limited user-provided parameters, the configurator may perform a number of calculations to develop a set of optimized configuration settings for one or more of wireless transmitter 110 and wireless receiver 150. In turn, the configurator may provide the corresponding configuration settings to a given wireless device for storage in a non-volatile memory of the device. In this way, a user such as an end user who is unsophisticated with regard to the devices themselves (or any other user lacking highly technical or skilled knowledge of wireless communications), may appropriately configure devices to enable desired wireless communications to occur. For example a user may be a so-called maker/designer/builder of devices for which wireless communication capabilities are desired. For example, these devices may be IoT devices of many different types, ranging from security and home automation systems, to drones, toys, or so forth. Instead of having to design wireless communication capabilities and/or hire a skilled engineer to develop settings for use in such systems, the user may generate settings using a configurator as described herein. Then the user may download the settings into the wireless devices themselves (e.g., into a non-volatile storage within an IC). Such ICs may include microcontrollers, systems on chip or other ICs having integrated wireless functionality (e.g., wireless receiver and transmitter, for one or more wireless protocols).

In a particular aspect, this configurator may be used to generate configuration settings relating to a variety of wireless device properties. These configuration settings may include receiver properties such as bandwidths, demodulator selection, decimation configuration and frequency characteristics. Of course while such settings are some example use cases of a configurator, many more use cases are possible, both for receiver and transmitter.

FIG. 1 includes high level views of transmitter 110 and receiver 150. As shown, wireless transmitter 110 includes a pulse shaper 120, which may be implemented as a pulse shaping filter that receives an incoming information signal and shapes it accordingly. In turn, pulse shaper 120 is coupled to a modulator 130, which modulates the incoming signal. As an example, modulator 130 may be configured as some type of frequency modulator, which may take various forms such as a frequency shift keying (FSK) modulator. In turn, the resulting modulated signal, after up conversion to a radio frequency (RF) signal (via a mixer, not shown in FIG. 1) is transmitted via an antenna 140.

In turn, wireless receiver 150 receives the incoming RF signal via an antenna 160 and provides it, after down conversion to a lower frequency signal such as an intermediate frequency (IF), zero intermediate frequency (ZIF) or baseband signal (e.g., via a mixer not shown in FIG. 1), to a re-sampler/decimator 170, which reduces the sampling rate. The resulting signal is provided to a channel filter 180, which applies appropriate channel filtering. In turn, the filtered signal is provided to a demodulator 190, which demodulates the signal to output a corresponding demodulated signal. Understand that a plurality of demodulation techniques may be used, and a given wireless receiver may include one or more demodulators to be selected for use based on desired operation mode.

Figure 2:
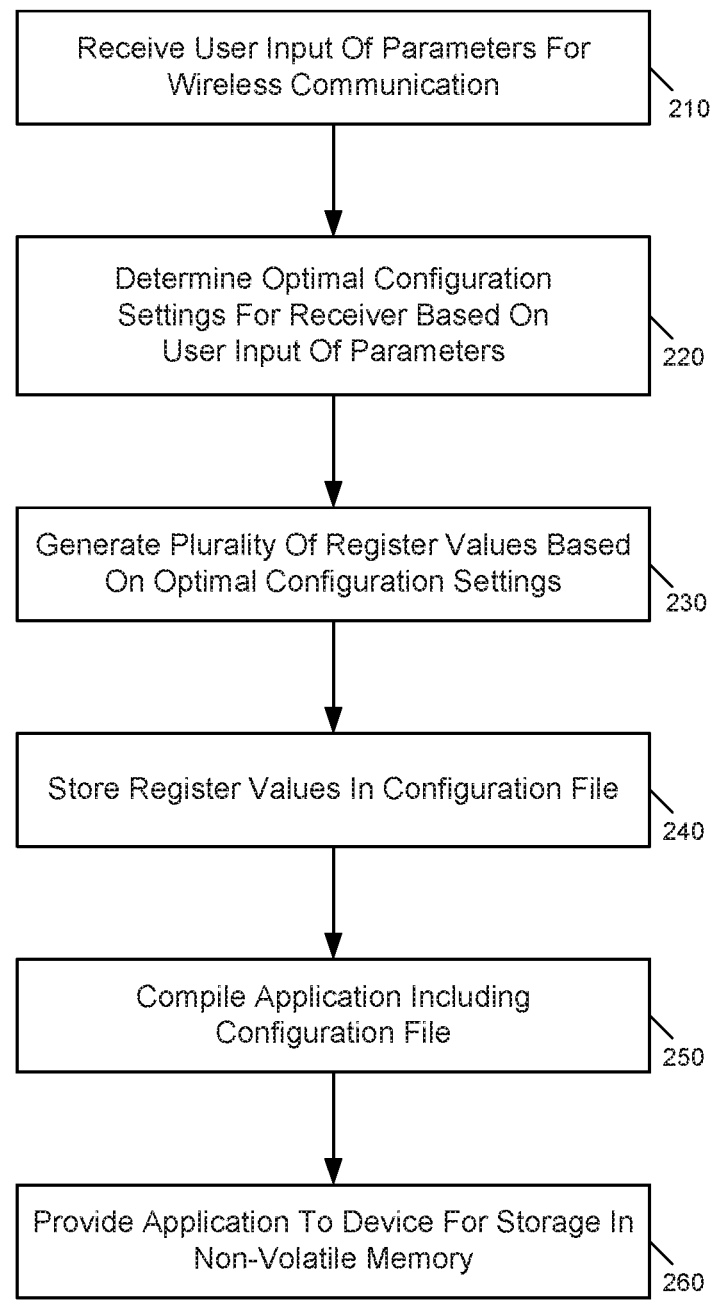
FIG. 2 is a flow diagram of a method in accordance with an embodiment.

Referring now to FIG. 2, shown is a flow diagram of a method in accordance with an embodiment. As shown in FIG. 2, method 200 is a method for configuring optimal configuration settings for a wireless receiver. Method 200 may be performed by a hardware configurator, which may be implemented as hardware circuitry, firmware, software and/or combinations thereof.

Note that the hardware configurator may be executed on a computing platform that executes a program stored in at least one non-transitory storage medium that includes instructions to execute a number of routines to determine configuration settings for a variety of different components of wireless devices, including wireless transmitters and receivers as described herein. In embodiments, a user may access this configurator device using a graphical user interface that seeks user entry of a limited number of configuration parameters for a wireless environment. From there, the configurator device may determine configuration settings and generate a configuration file including these settings and provide them for storage in one or more non-volatile memories associated with the wireless devices themselves.

As illustrated, method 200 begins by receiving user input parameters for desired wireless communication (block 210). For example, a user may be presented with one or more graphical user interfaces through which the user may input a small number of user-defined parameters. For purposes of discussion herein, these parameters may be provided at a very high level. For example, an unsophisticated user may simply provide information regarding a wireless environment and desired use case, such as a range of wireless communication between a transmitter and a receiver, power levels, amounts of data, data rates, desired wireless communication protocol, modulation scheme and so forth. Depending upon implementation, only very high level information such as described above may be provided. In other cases, a user may provide some more detailed information, including desired modulation index, transmitter and receiver characteristics, including filtering characteristics, decimation characteristics and so forth.

In any event, control passes from block 210 to block 220 where the configurator may determine optimal configuration settings for (at least) a wireless receiver based on the user input of parameters. Note that these optimal configuration settings may be automatically determined algorithmically based on the high level input provided by the user. To this end, the configurator may include various subroutines that are configured to determine one or more configuration settings for components of the wireless receiver based on the limited user input.

Note that these subroutines may execute in a non-deterministic manner. That is, it does not matter what subroutine is executed in which order. This is so, since each subroutine, during execution, proceeds to a final determination of one or more configuration values, or a determination that the subroutine cannot complete, due to incomplete input information. Then on another iteration of the multiple subroutines, a given subroutine may be able to access all of its inputs, such that it may complete to a final determination of one or more configuration values. Such operation proceeds iteratively until all subroutines complete. And in some embodiments, the subroutines may continue to execute until a complete iteration of the subroutines completes without a single configuration setting changing. This completion thus ensures that most optimal configuration settings are provided for all parameters.

Still referring to FIG. 2, next at block 230 multiple register values may be generated based on the optimal configuration settings. For example, each subroutine may output a final optimal configuration setting (or multiple such settings). In turn, each of these configuration settings may be mapped to a given register within the wireless receiver that is to receive and store the configuration setting(s) for use in receiver operation, as described more fully herein. As further shown, at block 240 these register values may be stored into a configuration file. In addition, the configurator may present the individual configuration settings to the user via another screen of the graphical user interface. In some cases, the configurator may seek user confirmation of one or more of the configuration settings.

Still with reference to FIG. 2, next at block 250 an application may be compiled that includes this configuration file. For example a toy helicopter that is controlled by a wireless MCU has an application running that controls all actions of the helicopter. This application may control the motors, LEDs, rotors and whatever else that is to be controlled. All these controls have nothing to do with the wireless capabilities, which may be used to communicate with the remote control of the toy. So in this case the application that controls the helicopter would be the main application and the modem would be programmed only to send a handful of commands between the remote and the helicopter.

Still with reference to FIG. 2, at block 260 this application may be provided to at least one device, e.g., a given wireless receiver, for storage in a non-volatile memory. At this point, the wireless receiver is appropriately configured for normal operation. Then when the wireless receiver is powered on in the field, it may access this configuration file and provide the configuration settings to the appropriate registers of the wireless receiver for storage and use. Understand while shown at this high level in the embodiment of FIG. 2, many variations and alternatives are possible.

Figure 3:
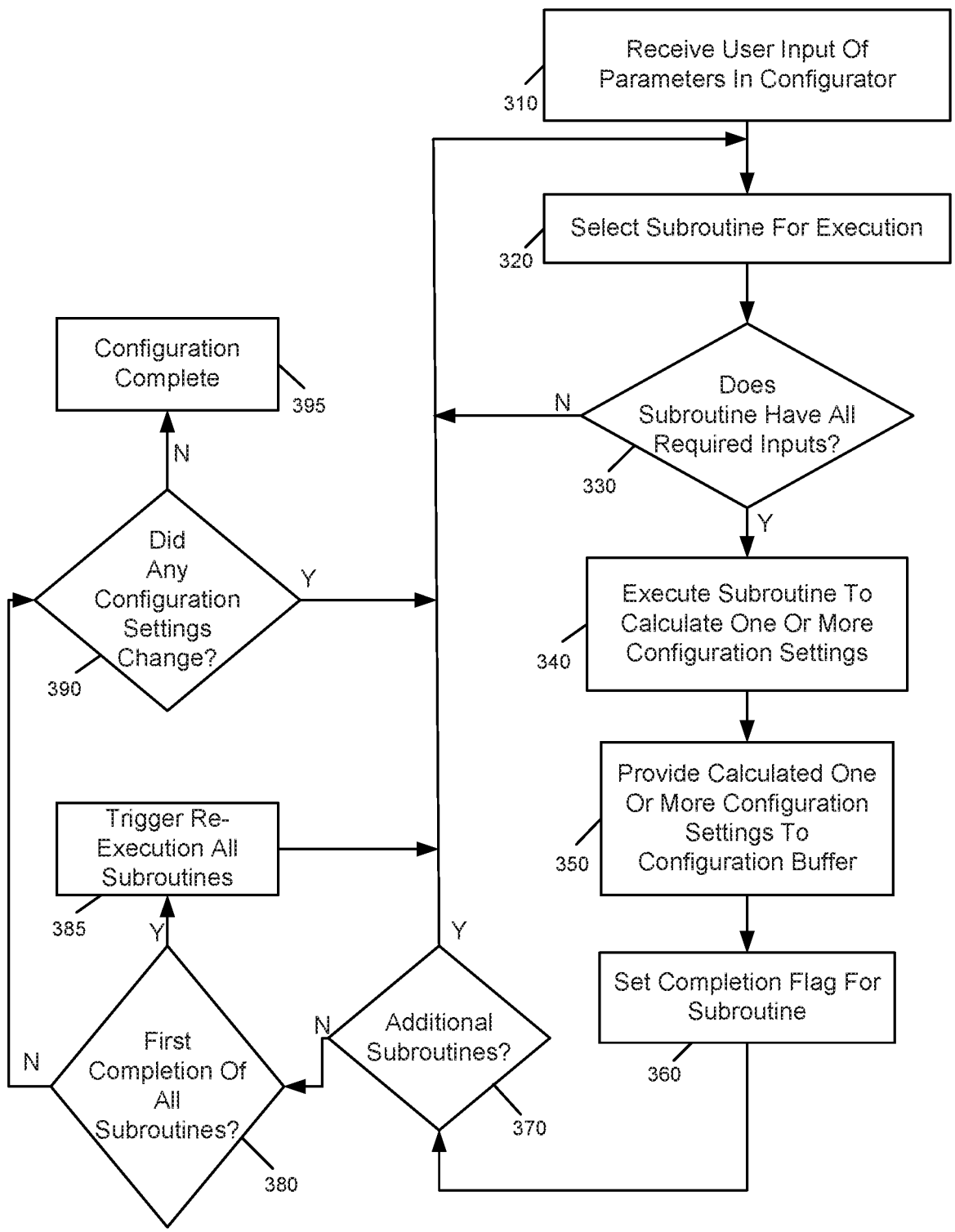
FIG. 3 is a flow diagram of a method in accordance with another embodiment.

Referring now to FIG. 3, shown is a flow diagram of a method in accordance with another embodiment. As shown in FIG. 3, method 300 is a method for executing multiple subroutines in a configurator to determine optimal configuration settings for a wireless device. Method 300 may be performed by a hardware configurator, which may be implemented as hardware circuitry, firmware, software and/or combinations thereof.

As illustrated, method 300 begins by receiving various user input parameters in the configurator (block 310). As discussed above, these user-defined parameters may be at a relatively high level and relatively few in number. In an embodiment, the configurator may provide one or more graphical user interfaces (GUIs) or other user input mechanisms to enable the user to provide the user-defined parameters. Generally, such information may include relatively high level parameters such as operational frequency, crystal frequency, modem information, packet information, symbol coding information, channel coding information and so forth. Next control passes to block 320 where a subroutine may be selected for execution. Note that there is no requirement for a particular order of subroutine execution, since the process is performed iteratively until all subroutines can validly execute to obtain desired configuration settings.

Still with reference to FIG. 3, the selected subroutine determines whether all required inputs are available (diamond 330). The inputs may be received from the user, or they may be generated within the configurator as a result of another subroutine's execution (or combinations of these alternatives). If all inputs are available, control passes to block 340 where the subroutine is executed. Depending upon subroutine, various operations may be performed based on the inputs to generate and/or calculate one or more configuration settings for a wireless device. On successful completion of the subroutine execution, control passes to block 350 where the one or more configuration settings may be stored in a temporary storage, referred to herein as a configuration buffer. In addition, at block 360 a completion flag is set for the subroutine to indicate that the subroutine has successfully completed execution, resulting in the generation of one or more configuration settings.

Still with reference to FIG. 3, next at diamond 370 it is determined whether there are additional subroutines to be executed. In an embodiment, the completion flag of each subroutine may be checked to identify when all subroutines have completed. Or an overall completion flag may be set when all subroutines complete.

In some embodiments, there may be between and 500 and 2000 subroutines that execute, each of which may result in one or more configuration settings. For example, to generate settings for a wireless receiver, between approximately 1000 and 1500 subroutines may execute to obtain between approximately 100 and 1000 configuration settings. In some cases there may be a separate subroutine for each calculation. As an example for a given register setting there may be at least one subroutine. In most cases a subroutine may calculate one or more intermediate variables, and then another subroutine may calculate a final register setting. In turn, yet another subroutine may read the register setting and convert it into a more meaningful result, referred to as an actual value.

Still referring to FIG. 3, if it is determined at diamond 370 that there are additional subroutines to execute, control passes back to block 320 discussed above. Otherwise when it is determined that there are no further subroutines to be executed, i.e., all subroutines have executed until completion, control passes to block 380.

At diamond 380, it may be determined whether this is the first completion of execution of all subroutines. In an embodiment this situation may be determined based on setting of a first completion flag or so forth. If so, control passes to block 385 to trigger re-execution of all subroutines. In an embodiment, this re-execution may occur to confirm the configuration settings. This is so, since it is possible for some inputs to change as additional subroutines execute, which in turn may cause a change in one or more configuration settings of one or more subroutines.

As shown, control in this case passes back to block 320 to begin the re-execution, e.g., with a randomly selected one of the multiple subroutines. As described above, this re-execution may be performed using available inputs to re-generate and/or re-calculate one or more configuration settings of the multiple subroutines. Operation thus proceeds until all subroutines are again executed.

Then when it is determined at diamond 380 that this is not the first completion of all subroutines, control passes to diamond 390 where it is determined whether any configuration settings determined by any of the subroutines changed. In one embodiment, a single change flag may be set by any of the subroutines if a repeated execution results in one or more different configuration settings. If a change is identified, all subroutines again may be re-executed, beginning at block 320. Such operation may proceed iteratively until execution of all subroutines completes in which no configuration settings change.

When configuration is complete in this way, at block 395 a configuration file may be generated that includes the configuration settings. Such configuration settings herein may be used to configure a wireless device such as transmitter and/or receiver. As examples, these configuration settings may include control signals, register settings and so forth. In one implementation, a configuration file may include approximately 1000 register settings, and the resulting configuration may provide a number of variables (e.g., 300 or more) that can be displayed to an end user at the conclusion of the configuration process via a GUI, to possibly allow the user to confirm such settings.

Note that it is possible for there to be multiple configuration files determined for a given wireless device, e.g., each for handling one of multiple modulation types, communication rates or so forth. In such cases the wireless device thus may be configured to dynamically determine a given one of multiple configuration files to use for configuring the device, e.g., based on use case, signal metric information or so forth. Or a static control may be set by the end user, e.g., based on use case. Understand while shown at this high level in the embodiment of FIG. 3, many variations and alternatives are possible.

Figure 4:
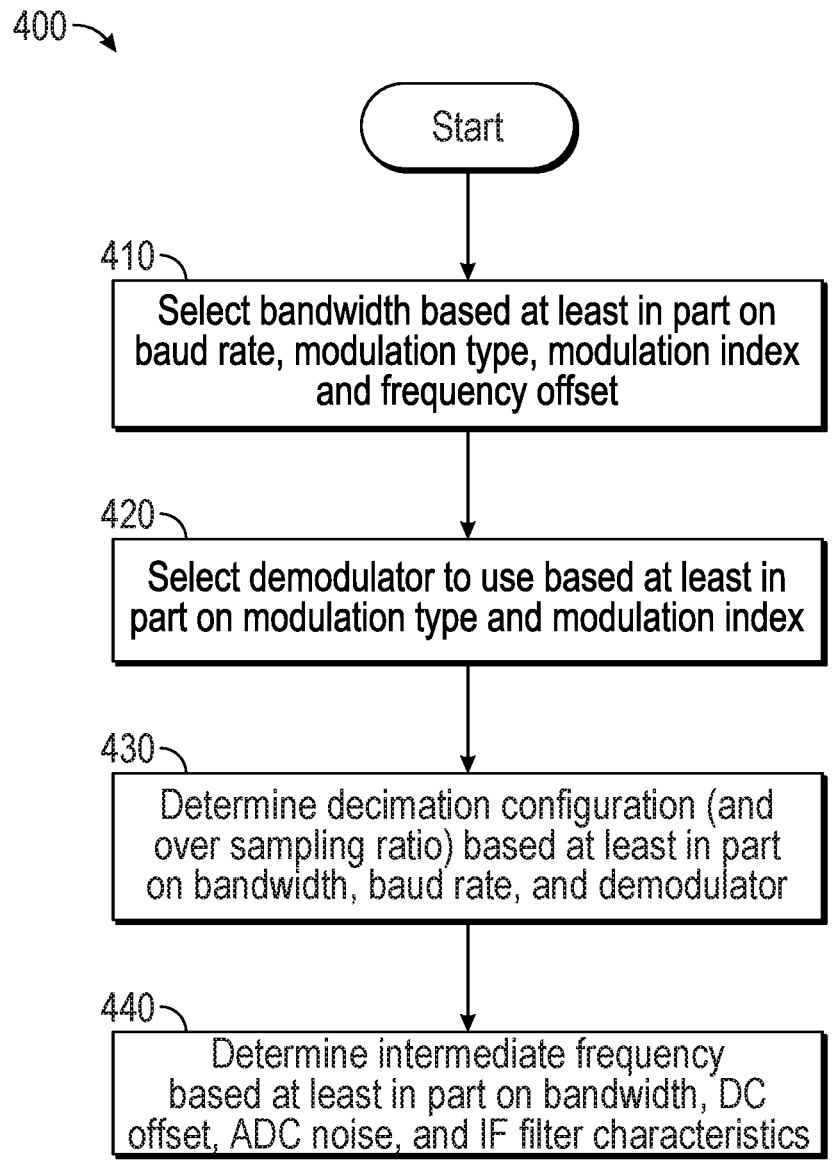
FIG. 4 is a flow diagram of a method in accordance yet with another embodiment.

Referring now to FIG. 4, shown is a flow diagram of a method in accordance with yet another embodiment. More specifically, method 400 of FIG. 4 is a method for automatically determining selected configuration settings for a receiver, in a configurator. As such, method 400 may be performed by a hardware configurator as described herein. Method 400 begins by selecting a bandwidth for the receiver (block 410). In an embodiment, a bandwidth determination may be based at least in part on baud rate, modulation type, modulation index and frequency offset. At a first order, baud rate and deviation (i.e., frequency offset) may be considered in determining bandwidth. In some embodiments, additional considerations such as modulation type also may be taken into account in selecting a bandwidth configuration for a receiver. As a result of this bandwidth selection, the configurator may generate configuration settings to effect the bandwidth. In an embodiment, this bandwidth information may be provided to a channel filter to cause the channel filter to be dynamically configured for the appropriate bandwidth.

In some cases, multiple bandwidths may be calculated. A first bandwidth may be used for an acquisition mode or phase, in which a wider bandwidth is used to account for frequency offset. Once a signal is acquired, the frequency offset may be corrected and control of the receiver may switch to a bandwidth for a demodulation mode, where this demodulation bandwidth is narrower than the acquisition bandwidth. Note also that different bandwidths may be provided based on the demodulator selected (as described below). For example a Viterbi demodulator works best with narrow bandwidths.

Still with reference to FIG. 4, at block 420 the configurator may determine which of multiple demodulators to use, based at least in part on a modulation type and modulation index. More specifically, the configurator may receive user input regarding a desired modulation type and modulation index. Based at least in part on this information, the configurator may select one of multiple demodulators of a wireless receiver for configuration. In some embodiments, the configurator may base its selection of a demodulator on further inputs, including frequency offset information and baud rate offset information. In some cases this information also may be received in the configurator from the end user.

In an embodiment, a given subroutine of the configurator may be used to select the demodulator. In some cases, this subroutine may provide for multiple classes of input parameters for use in selecting a demodulator. To this end, incoming inputs may be used to identify one of the multiple classes. In turn, each of these classes may be associated with a priority list of demodulator types. Thus once a class is determined, the configurator may next determine, based on the input parameters, whether the highest priority demodulator type for that class is able to be used. If not, a next priority demodulator type may be considered for use and so forth, until a demodulator is selected. As one example of the class structure and priority arrangement, consider input parameters that indicate a desired demodulation type of frequency shift keying (FSK). While in an embodiment, all available demodulators may be able to perform FSK demodulation, depending upon other input parameters, such as oversampling rates, baud rate offset requirements, frequency offset requirements or so forth, certain demodulators may not be appropriate, and thus a priority-based determination may proceed until a demodulator that can meet the input parameters is found.

As a result of this selection, the configurator may generate configuration settings to affect this demodulator selection. In an embodiment, such configuration settings may include control values to be provided, e.g., to a selection circuit such as a multiplexer, to direct modulated signals to an appropriate demodulator. In other cases, more complex switching control may be used to enable appropriate routing of the modulated signals to various portions of a receiver chain, including possibly providing signaling through multiple demodulator paths so that certain circuitry of multiple demodulators may be shared to demodulate incoming signals.

Still with reference to FIG. 4, next at block 430 a decimation configuration for the receiver may be determined. Note that this determination may further include determination of an oversampling ratio. In an embodiment, the configurator may determine the decimation configuration based at least in part on bandwidth, baud rate, and selected demodulator.

In an embodiment, a subroutine of the configurator for determining the decimation configuration may perform an exhaustive search, using the possible decimation rates of the multiple decimators of the receiver. In one particular embodiment, a receiver may include at least three decimators, each programmable to operate at one of multiple decimation factors. In one embodiment, a first decimator may be controlled to operate at decimation rates of three, four or eight, a second decimator may be controlled to operate with a controllable decimation factor between one and 16,000, and a third decimator may be configured to operate at a decimation rate of between approximately 1 and 63. Of course other decimation factors are possible in other embodiments. Note that in addition to bandwidth, baud rate and demodulator type, additional considerations may be included in making a decimation configuration determination. For example, modulation type and index, and intermediate frequency may be considered. In addition to these decimators, a receiver may further including at least one sample rate converter that may be controllable as well. Note that the decimation configuration determination may also consider whether a candidate decimation configuration meets a required overall filter response to reject interferers.

Note that in determining a decimation configuration, different oversampling rates of the different decimators may be considered based on the selected demodulator type. For example, when a Viterbi demodulator is selected, it may be desirable to have an oversampling rate of between approximately 4-7 at an input of the demodulator. To achieve this oversampling rate range, different combinations of decimation factors for the different decimators may be considered. As another example, another demodulator (referred to as a bit clock recovery (BCR) demodulator), when selected, may desirably have a non-integer oversampling rate that may be in a range of between approximately 3-255. To effect this non-integer rate, it may be possible to de-select a sample rate converter within the receiver chain when this particular demodulator is selected. As a result of the selection, the configurator may generate configuration settings to affect the different decimators' decimation factors. In an embodiment, such configuration settings may be communicated to the decimators to effect their programming to the requested decimation factors (or to disable one or more decimators or sample rate converters for a given configuration).

Still with reference to FIG. 4, next at block 440 an intermediate frequency may be determined. In an embodiment, this determination may be based at least in part on bandwidth, DC offset, an ADC noise level, and IF filter characteristics. Note that at a first order, the bandwidth may be used by a given subroutine of the configurator to determine intermediate frequency. Note that a sampling rate of the ADC itself may be controlled based at least in part on bandwidth. For example, when bandwidth is less than a first threshold level (e.g., less than approximately 100 kilohertz (kHz)), the ADC may be configured to operate at a crystal rate. When bandwidth is instead greater than this first threshold level and less than a second, higher threshold (e.g., approximately 1 megahertz (MHz)), the ADC sampling rate may be set at 4×. And in turn, when the bandwidth exceeds this higher second level, the sampling rate may be set at 8×.

As described above, in addition to first order bandwidth considerations, the intermediate frequency further may be based on DC offset, ADC noise and IF filter characteristics, among other potential inputs. For example, where the bandwidth is large, the IF frequency may be selected such that the lower edge of the desired band is at least 50 kHz away from DC so that phase noise due to DC offsets is avoided. Further, IF filter channel characteristics may be considered. For example it may be desirable for this filter bandwidth to be as narrow as possible and thus this filter bandwidth also may be considered in determining IF frequency. Furthermore, image band may also be considered, as image signals may interfere with blockers and thus this blocker performance may be considered. As a result of this selection of appropriate IF frequency, the configurator may generate one or more configuration settings. In an embodiment, the configuration settings may include programable control of a frequency synthesizer or other clock control mechanism that generates a mixing signal that is used to downconvert an RF signal to a lower frequency signal.

Note that while the above discussion is with regard to determining a single configuration for a device, it is possible for a configurator to determine multiple configurations for a single wireless device. This is so, in that various wireless devices including transmitters and receivers may be configured to operate using different wireless protocols, different bandwidths, data rates and so forth. As such, it is possible for a configurator to determine multiple configurations so that a given wireless device may dynamically operate at different ones of the multiple configurations. For example, it is possible for a wireless device such as a receiver to begin operation in a first configuration mode, e.g., at a first data rate, and then, based on, e.g., environmental conditions, to operate in a second configuration mode at a different rate. As another example, a wireless device such as a light bulb having wireless capability may provide for two different modes of operation, with a different configuration for each of the different modes. For example, control information may be communicated according to a first configuration and maintenance information (e.g.,) may be communicated according to a second configuration.

In various embodiments, a wireless receiver may include circuitry for performing wireless communications according to different communication protocols including multiple short-range wireless protocols and wide area wireless protocols. To this end, a receiver may include multiple independent receiver chains or portions thereof. The receiver may, based at least in part on configuration settings, controllably direct signals of different wireless protocols along different paths of the receiver.

Figure 5:
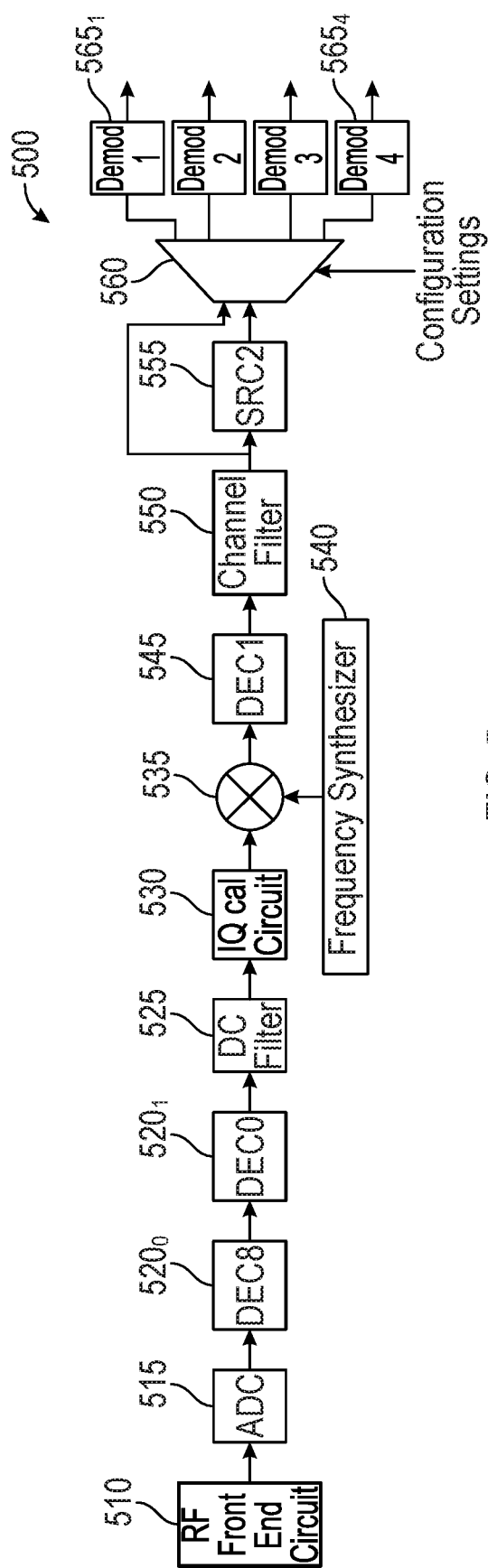
FIG. 5 is a block diagram of a portion of a wireless receiver in accordance with an embodiment.

Referring now to FIG. 5, shown is a block diagram of a portion of a wireless receiver in accordance with an embodiment. As shown in FIG. 5, wireless receiver 500 may be implemented on a single semiconductor die and may include various circuitry to receive and process incoming signals. In some cases, the wireless receiver 500 may be implemented as a single integrated circuit (including a single semiconductor die) that provides for all receiver operations, including tuner and receiver functionality. In some cases demodulator and decoding operation functionality also may be implemented on die. Still further with embodiments herein, this single integrated circuit (and even on the same single semiconductor die) may include non-volatile memory to store configuration settings developed or generated by a hardware configurator as described herein.

With reference to FIG. 5, wireless receiver 500 includes an analog RF front end circuit 510 that is configured to receive an incoming RF signal and perform various processing such as gain control, e.g., using a low noise amplifier and/or additional gain stages, filtering, down conversion using a mixer, and so forth. In turn, the resulting signals are provided to an analog-to-digital converter (ADC) 515 for digitization. Then, sample rate conversions may be performed in one more decimators, two of which are shown (decimators $520_0$-$520_1$). Of course, a receiver chain may include additional decimators. In various embodiments, the number of decimators and the sample rate conversions performed by the decimators may be controlled according to configuration settings determined as described herein.

As further shown in FIG. 5, receiver 500 also includes a DC filter 525 and a calibration circuit 530, which may perform IQ calibration between in-phase and quadrature signals in a complex receiver implementation. Mixer 535 may convert the signals to a lower frequency, e.g., a given intermediate frequency or baseband, using a mixing signal received from a frequency synthesizer 540.

After this down conversion, additional sample rate conversion may be performed in another decimator 545. And then channel filtering may be performed in a channel filter 550. As seen, channel filtered signals may be provided both to a sample rate converter 555 and directly to a selection circuit 560.

In an embodiment, selection circuit 560 may be implemented as a multiplexer. Depending upon configuration settings for a receiver and a particular modulation scheme of received signals, receiver 500 may direct either sample rate converted signals output from sample rate converter 555 or the direct output from channel filter 550 to a given one of multiple demodulators. In the high level shown in FIG. 5, a plurality of demodulators $565_1$-$565_4$ may be present. Of course in a particular receiver more or fewer demodulators may be present. Understand that after demodulation, additional processing including decoding and audio processing may be performed on the resulting demodulated signals.

With the arrangement in FIG. 5, modulated signals from different points of the receiver chain may be provided to a selected one of demodulators 565. As described further herein, these different demodulators may be wholly independent, such that different circuitry exists for each demodulator. In other cases, at least some of the demodulators may share at least portions of demodulator circuitry, to reduce the amount of chip real estate and design costs. Still further, while in the high level shown in FIG. 5, a selected input signal to selection circuit 560 is passed to a given one of demodulators 565, in particular embodiments after initial processing in one demodulator, signal information in turn may be provided to another demodulator, in instances where at least some circuitry is shared. Understand while shown at this high level in the embodiment of FIG. 5, many variations and alternatives are possible.

Figure 6:
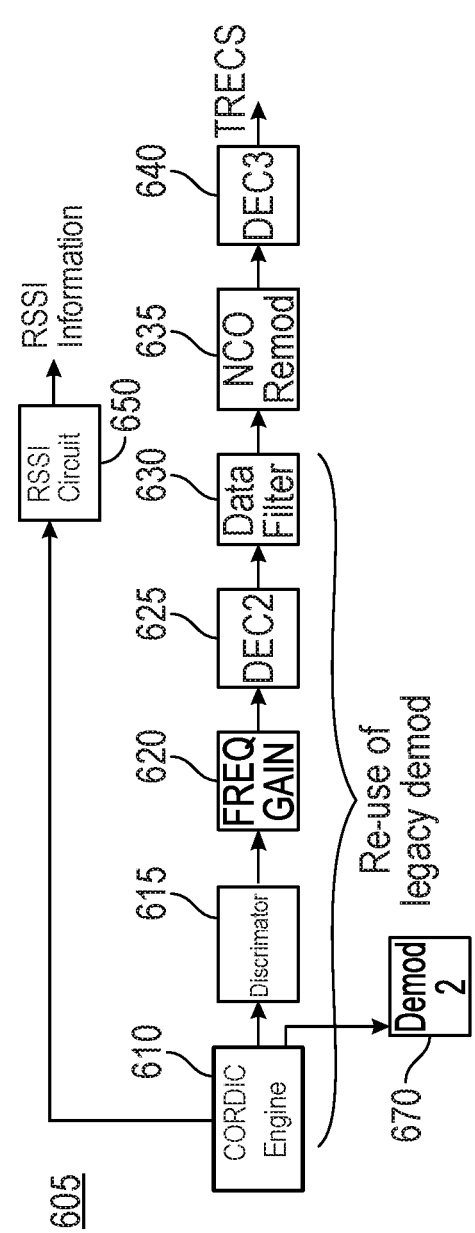
FIG. 6 is a block diagram of demodulator circuitry in accordance with an embodiment.

Referring now to FIG. 6, shown is a block diagram of a demodulation circuit in accordance with an embodiment. As shown in FIG. 6, circuit 600 includes at least several demodulator paths. As seen, a main demodulator path 605 is coupled to receive incoming modulated signals, e.g., from a selection circuit, in a CORDIC engine 610 that is configured to generate phase information. In turn, this phase information is provided to a phase discriminator 615 (or a differentiator) which converts the phase information to frequency information. Frequency gain processing may be performed in a frequency gain block 620. Thereafter, sample rate may be reduced in a decimator 625. The resulting signals are provided in turn to a data filter 630, and then to a numerically controlled oscillator (NCO) remodulator 635, which remodulates the signals and provides them to another decimator 640. Thereafter, the resulting signals are sent to additional demodulation circuitry (not shown in FIG. 6), namely a timing and recovery-based demodulator (TRECs). Note that depending on configuration, one or more of the decimators may be programmably controlled for a particular decimation rate and/or be configured to be disabled.

As further shown in FIG. 6, amplitude information may be output from CORDIC engine 610 to a received signal strength indicator (RSSI) circuit 650, which in turn calculates RSSI values based on the amplitude information. Note that in some cases RSSI circuit 650 may calculate the RSSI values based on averaging the incoming of amplitude information and further based on information regarding gain settings of front end amplification stages such as automatic gain control (AGC) settings. In some receiver implementations a channel power metric also may be determined, and which may have different averaging requirements than the RSSI information (e.g., less averaging for a faster turnaround time). This signal metric information may be used in certain AGC modes.

As further illustrated in FIG. 6, signal information output from CORDIC engine 610 may be provided to another demodulator 670, which may perform a Viterbi demodulation when configuration of the receiver calls for use of this demodulator. Understand while shown at this high level in the embodiment of FIG. 6, many variations and alternatives are possible.

In one particular embodiment, a wireless receiver may include four demodulators, such as shown above in FIG. 5.

A first demodulator may be a legacy demodulator that is configured to handle the widest range of modulation types. Such demodulator may use sample differentiation as performed in phase discriminator 615 and perform frequency gain, decimation and data filtering such as shown in FIG. 6.

A second demodulator may be a timing and recovery-based demodulator (TRECs) and Viterbi-combined demodulator. Such demodulator may provide optimal demodulation for frequency shift keying (FSK) modulation schemes where a modulation index is relatively small (e.g., less than approximately 1.0) and bandwidth is narrow enough to generate a partial response. In some cases, this demodulator may be used without performing Viterbi-based operations by slicing to the output to obtain hard decisions. In an embodiment, this second demodulator may receive as an input phase information from a CORDIC engine (such as CORDIC engine 610 of FIG. 6).

In an embodiment, a third demodulator may be implemented as a bit clock recovery (BCR) demodulator that receives channel filtered signals as an input. In this way, note that at least one sample rate converter of a receiver chain may not be used in processing signals for this demodulation scheme.

In an embodiment, a fourth demodulator may be implemented as a coherent demodulator, which may be suitable for handling demodulation of offset quadrature phase shift keying (OQPSK) and direct sequence spread spectrum (DSSS) signals, such as may be implemented in accordance with a Zigbee communication protocol. In an embodiment, this coherent demodulator may provide a highest performance level (e.g., highest sensitivity) of the multiple demodulators. In an embodiment, the input to this demodulator may be modulated signals output from a sample rate converter. While described with these example demodulators, understand that in other implementations more or fewer demodulators, and potentially of different types may be used.

Figure 7:
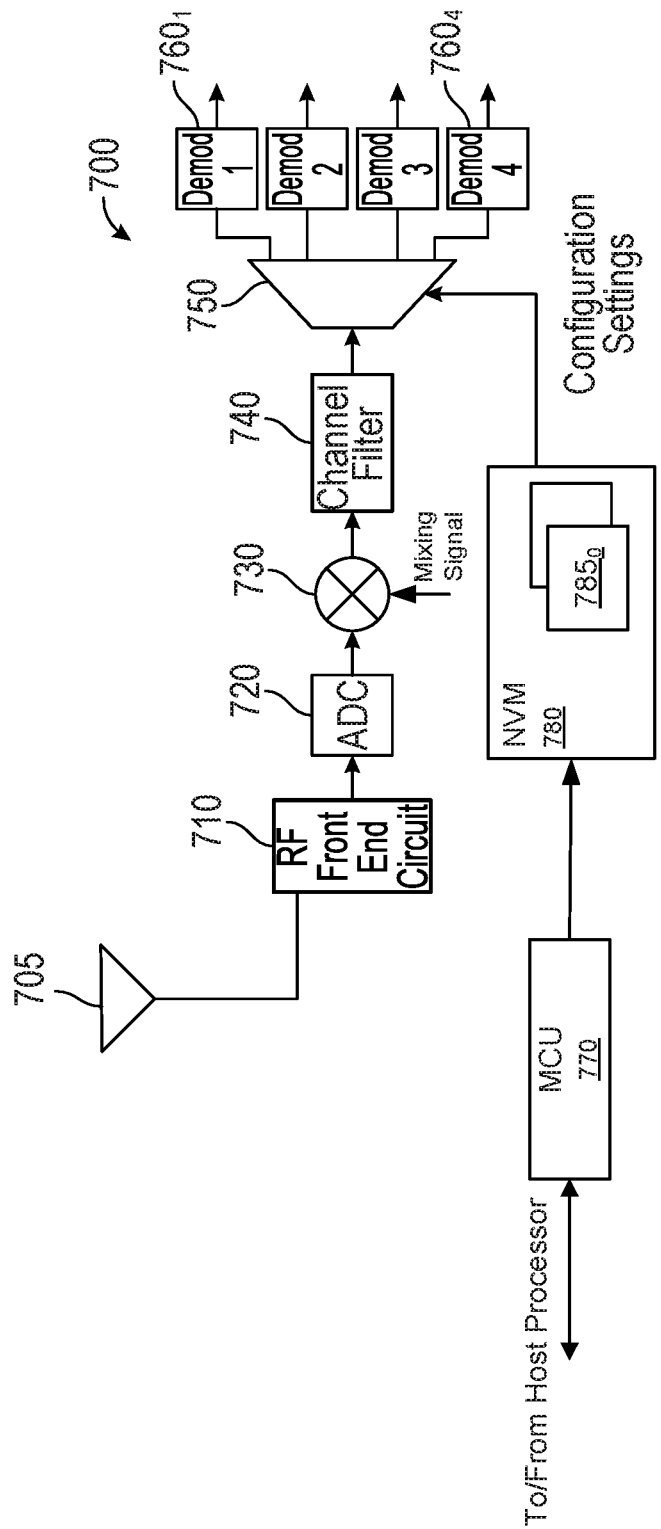
FIG. 7 is a block diagram of a wireless device in accordance with an embodiment.

Referring now to FIG. 7, shown is a block diagram of a wireless device in accordance with an embodiment. As shown in FIG. 7, wireless device 700 may be any type of device that can at least receive RF signals. In some cases, the device may be an IoT device that has both receive and transmit capabilities. For ease of discussion only a receiver portion of wireless device 700 is shown.

In the high level shown in FIG. 7, wireless device 700 receives incoming RF signals via an antenna 705. In turn, the incoming RF signals are provided to an RF front end circuit 710. RF front end circuit 710 may perform various processing such as gain control, e.g., using a low noise amplifier, additional gain stages, filtering, down conversion and so forth. In turn, the processed RF signals are provided to a digitizer, implemented in the embodiment of FIG. 7 as an ADC 720, for digitization. In turn, digitized signals are provided to a mixer 730, which further downconverts the RF signals to a lower frequency, e.g., an intermediate frequency baseband or so forth, using a mixing signal (which may be received from a frequency synthesizer, phase lock loop or so forth (not shown for ease of illustration in FIG. 7)). Although not shown in the high level of FIG. 7, understand that various additional components may be present in a receive path, such as one or more decimators, a DC filter, an IQ calibration circuit or so forth.

Still with reference to FIG. 7, after downconversion to a lower frequency, the resulting signals are provided to a channel filter 740 for channel filterization. After filtering, these signals are provided to a selection circuit 750 which may be implemented as a multiplexer to selectively provide the signals to one of multiple demodulators $760_1$-$760_4$.

As shown in FIG. 7, selection circuit 750 may be controlled based on one or more configuration settings stored in a non-volatile memory 780. More specifically, as described herein these configuration settings may be present in one of multiple configuration files $785_{0-n}$ stored in non-volatile memory 780. And as described herein, this configuration file may be generated by a hardware configurator based on minimal user input parameters. As further shown in FIG. 7, a microcontroller unit (MCU) 770 may couple to a host processor of wireless device 700. Based on control information from this host processor, which may include information for a desired wireless communication protocol, MCU 770 in turn may select an appropriate one of multiple configuration files 785 within non-volatile memory 780 for use in configuring selection circuit 750. In addition, various other configuration settings of the selected configuration file may be used for purposes of providing configuration values to configuration registers, providing control signals for additional circuitry of wireless device 700 and so forth. Understand while shown at this high level in the embodiment of FIG. 7, many variations and alternatives are possible.

Figure 8:
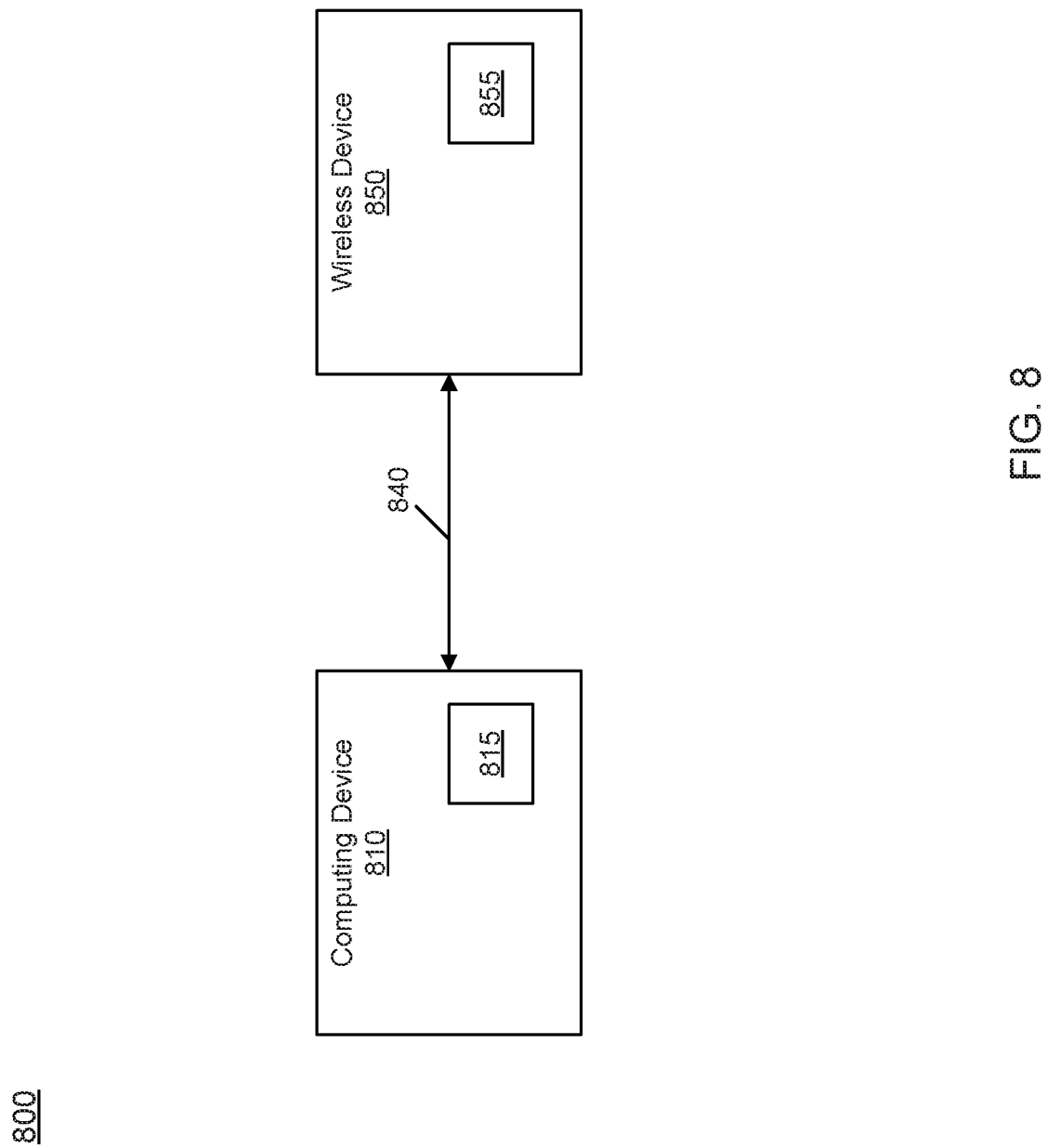
FIG. 8 is a block diagram of a configuration environment in accordance with an embodiment.

Referring now to FIG. 8, shown is a block diagram of a configuration environment in accordance with an embodiment. As shown in FIG. 8, configuration environment 800 includes a computing device 810. Computing device 810 may be any type of computer system, ranging from a laptop or desktop computer, a server computer or even a smaller device such as a tablet or smartphone having a hardware configurator as described herein. Understand that an end user may use computing device 810 to generate a configuration file for a wireless device, Computing device 810 may include various circuitry including one or more processors, communication buses, memory, display and other input/output circuitry, including a user input mechanism such as a touch panel, keypad or so forth and other circuitry. Understand that with embodiments herein, an included memory and/or mass storage device (generally illustrated at item 815) may include instructions stored in a non-transitory storage medium for execution by the hardware configurator. In embodiments, the one or more processors may execute such instructions to implement this hardware configurator. In other cases, dedicated hardware circuitry may be provided to implement the hardware configurator.

In any event, in execution, the hardware configurator may cause a series of graphical user interfaces (GUIs) to be displayed on a display device that allows the end user to select and/or input user input parameters for a variety of different features. As described above, the GUIs may provide for user input or selection of a variety of different user-defined parameters. Such parameters may include operational frequency, e.g., in the form of a base channel frequency and a channel spacing, crystal frequency information including a crystal frequency and accuracy. In addition, the GUIs may provide for input of modem information, including modulation type, bit rate, deviation, baudrate tolerance, and shaping filter information (e.g., of different types, including Gaussian, raised cosine or so forth). The GUIs may further provide for input of packet-based information including general frame information, frame length information (fixed and variable length frames), frame type, CRC information and so forth. In addition, frame contents, including preamble, syncword and payload information can also be provided. The GUIs may further provide for input of symbol coding information and channel coding information.

In some embodiments, the GUIs may further provide for advanced information that an expert user may input, while instead a novice user does not provide anything for these inputs and the hardware configurator may determine such information. Note that this advanced information input allows an experienced user to fine tune certain parameters. In addition, the configurator may allow an end user to overwrite certain determined parameters in a manner that allows downstream calculations to use the overwritten values.

In turn, the hardware configurator, based on this information can determine the wide number of configuration settings for a wireless device 850. After the configuration file is finalized and stored within computing device 810, it may be provided to wireless device 850 for storage in an included non-volatile memory 855. In different implementations, this configuration file may be provided to wireless device 850 via a wired or wireless interconnect 840. More specifically, the configurator may couple to wireless device 850, e.g., via a USB or other interface. For example an I$^2$C, SPI, or another any protocol can be used for transmitting data. In some cases, the configuration file may be directly communicated to wireless device 850. This configuration file can also be updated wirelessly. For example, wireless device 850 can receive an update over the air and the rewrite non-volatile memory 850 with the new data. In other cases, once a customer has a specific image they could "image" it on their chips at production time or later, with multiple chips being imaged at once in a factory setting. Understand while shown at this high level in the embodiment of FIG. 8, many variations and alternatives are possible.

Note that embodiments may be used additionally by developers, debug engineers, validation and application engineers and so forth to generate configuration settings for use in performing simulations of a wireless device design. In addition, these expert users may further perform program design, debug and validation efforts on prototype silicon devices as well as testing manufactured integrated circuits. In this way, a developer may continue to further develop a device's design when final configuration settings can be determined, even before a calculation is defined. For example, instead of fixing thresholds for packet detection, embodiments enable a dynamic, relative threshold determination in which a receiver can identify relative strength of peak signals when a packet is detected and floor signals in the absence of packet detection, and dynamically set a threshold at a scaling value of the peak signal (e.g., according to a configuration setting for the scaling factor).

Embodiments thus allow users to abstract fine-grained details of a wireless device's configuration by enabling the user to provide, via a user interface, only a limited number of user-defined parameters from which a hardware configurator can develop all remaining configuration settings for the device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving, in a configurator for a wireless device, a plurality of user-defined parameters for configuring the wireless device for wireless communication;
   iteratively, for each of a plurality of subroutines of the configurator, determining whether all required inputs for the subroutine are available, in response to determining that all the required inputs are available executing the subroutine to determine one or more configuration settings associated with the subroutine and for the wireless device, and storing the one or more configuration settings in a configuration buffer, wherein a first subroutine of the plurality of subroutines is to select a first demodulator of a plurality of demodulators of the wireless device to operate using the required inputs comprising a modulation type and a modulation index to identify a class associated with a priority list of at least some of the plurality of demodulators, the class including the first demodulator;
   after the plurality of subroutines are executed, generating a configuration file including the one or more configuration settings associated with each of the plurality of subroutines; and
   configuring the wireless device with the configuration file to cause the wireless device to operate using the one or more configuration settings associated with at least some of the plurality of subroutines.

2. The method of claim 1, further comprising in response to determining that all the required inputs for a given subroutine are not available, proceeding to another subroutine of the plurality of subroutines to determine whether all the required inputs are available for the another subroutine.

3. The method of claim 1, further comprising in response to executing a given subroutine to determine the one or more configuration settings associated with the given subroutine, setting a completion flag for the given subroutine to indicate that the given subroutine successfully completed execution.

4. The method of claim 1, further comprising in response to determining that the plurality of subroutines have successfully executed, re-executing the plurality of subroutines to re-determine the one or more configuration settings associated with each of the plurality of subroutines.

5. The method of claim 4, further comprising after re-executing the plurality of subroutines, determining whether any of the one or more configuration settings have changed.

6. The method of claim 5, further comprising in response to determining that any of the one or more configuration settings have changed, again re-executing the plurality of subroutines.

7. The method of claim 5, further comprising in response to determining that none of the one or more configuration settings changed after re-executing the plurality of subroutines, forming the configuration file.

8. The method of claim 1, further comprising executing a second subroutine to determine a plurality of bandwidths for the wireless device based at least in part on the modulation type, a frequency offset and the selection of the first demodulator, the plurality of bandwidths comprising a first bandwidth for an acquisition mode and a second bandwidth for a demodulation mode.

9. The method of claim 1, wherein at least one of the required inputs for a given subroutine of the plurality of subroutines comprises a first configuration setting determined by a second subroutine of the plurality of subroutines.

10. The method of claim 1, wherein configuring the wireless device comprises communicating the configuration file from the configurator to a non-volatile storage of the wireless device for storage in the non-volatile storage.

11. A non-transitory computer readable storage medium comprising instructions that cause a configurator to perform a method comprising:

receiving, in the configurator, a plurality of user-defined parameters for configuring a wireless device for wireless communication;

iteratively, for each of a plurality of subroutines of the configurator, determining whether all required inputs for the subroutine are available, in response to determining that all the required inputs are available executing the subroutine to determine one or more configuration settings associated with the subroutine and for the wireless device, and storing the one or more configuration settings in a configuration buffer, wherein a first subroutine of the plurality of subroutines is to select a first demodulator of a plurality of demodulators of the wireless device to operate using the required inputs comprising a modulation type and a modulation index to identify a class associated with a priority list of at least some of the plurality of demodulators, the class including the first demodulator;

after the plurality of subroutines are executed, generating a configuration file including the one or more configuration settings associated with each of the plurality of subroutines; and configuring the wireless device with the configuration file to cause the wireless device to operate using the one or more configuration settings associated with at least some of the plurality of subroutines.

12. The non-transitory computer readable storage medium of claim 11, wherein the method further comprises in response to determining that all the required inputs for a given subroutine are not available, proceeding to another subroutine of the plurality of subroutines to determine whether all the required inputs are available for the another subroutine.

13. The non-transitory computer readable storage medium of claim 11, wherein the method further comprises:

in response to determining that the plurality of subroutines have successfully executed, re-executing the plurality of subroutines to re-determine the one or more configuration settings associated with each of the plurality of subroutines; and after re-executing the plurality of subroutines, determining whether any of the one or more configuration settings have changed.

14. The non-transitory computer readable storage medium of claim 13, wherein the method further comprises in response to determining that any of the one or more configuration settings have changed, again re-executing the plurality of subroutines.

15. The non-transitory computer readable storage medium of claim 11, wherein the method further comprises executing a second subroutine to determine a plurality of bandwidths for the wireless device based at least in part on the modulation type, a frequency offset and the selection of the first demodulator, the plurality of bandwidths comprising a first bandwidth for an acquisition mode and a second bandwidth for a demodulation mode.

* * * * *